United States Patent
Nakamura et al.

(10) Patent No.: US 9,811,411 B2
(45) Date of Patent: Nov. 7, 2017

(54) MANAGEMENT APPARATUS, METHOD AND PROGRAM

(71) Applicant: FUJITSU LIMITED, Kawasaki-shi, Kanagawa (JP)

(72) Inventors: Fumito Nakamura, Aoba (JP); Hiroko Sato, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 231 days.

(21) Appl. No.: 14/851,671

(22) Filed: Sep. 11, 2015

(65) Prior Publication Data
US 2015/0378810 A1 Dec. 31, 2015

Related U.S. Application Data

(63) Continuation of application No. PCT/JP2013/057613, filed on Mar. 18, 2013.

(51) Int. Cl.
G06F 11/00 (2006.01)
G06F 11/07 (2006.01)

(52) U.S. Cl.
CPC ...... G06F 11/0793 (2013.01); G06F 11/0721 (2013.01); G06F 11/0748 (2013.01); G06F 11/0751 (2013.01)

(58) Field of Classification Search
CPC ............ G06F 11/0721; G06F 11/0748; G06F 11/0751; G06F 11/0793
See application file for complete search history.

(56) References Cited

U.S. PATENT DOCUMENTS

| 6,289,379 | B1 | 9/2001 | Urano et al. |
| 2006/0123302 | A1 | 6/2006 | Hori |
| 2009/0037496 | A1* | 2/2009 | Chong ............... G06F 11/0709 |
| 2009/0300428 | A1 | 12/2009 | Matsumoto et al. |

(Continued)

FOREIGN PATENT DOCUMENTS

| JP | 9-297693 | 11/1997 |
| JP | 11-143738 | 5/1999 |

(Continued)

OTHER PUBLICATIONS

International Search Report, mailed in connection with PCT/JP2013/057613 and dated Jun. 18, 2013 (2 pages).

*Primary Examiner* — Michael Maskulinski
(74) *Attorney, Agent, or Firm* — Fujitsu Patent Center

(57) ABSTRACT

A disclosed management apparatus monitors hardware faults in an information processing apparatus. And the management apparatus includes a first processing unit that determines whether a first notification representing that a fault occurred includes identification information of hardware in which the fault occurred, upon receiving the first notification from the information processing apparatus; a second processing unit that transmits an execution request to execute a module for obtaining the identification information of the hardware to the information processing apparatus, upon determining that the first notification does not include the identification information of the hardware; and a third processing unit that transmits a stop request to stop executing the module to the information processing apparatus, upon receiving the identification information of the hardware from the information processing apparatus.

5 Claims, 8 Drawing Sheets

(56) References Cited

U.S. PATENT DOCUMENTS

| | | | |
|---|---|---|---|
| 2012/0158890 A1 | 6/2012 | Jreij et al. | |
| 2012/0210176 A1* | 8/2012 | Suzuki | G06F 11/0775 714/48 |
| 2015/0067139 A1* | 3/2015 | Malnati | H04L 43/04 709/224 |
| 2016/0028845 A1* | 1/2016 | Barr | G06F 11/0751 714/37 |

FOREIGN PATENT DOCUMENTS

| | | |
|---|---|---|
| JP | 2002-288067 | 10/2002 |
| JP | 2003-006002 | 1/2003 |
| JP | 2006-139493 | 6/2006 |
| JP | 2009-151407 | 7/2009 |
| JP | 2011-113243 | 6/2011 |
| JP | 2011-145824 | 7/2011 |
| JP | 2011-159011 | 8/2011 |
| JP | 2012-003651 | 1/2012 |
| JP | 2012-198796 | 10/2012 |
| WO | 2009/144969 | 12/2009 |
| WO | 2011/051999 | 5/2011 |

\* cited by examiner

| BUS NUMBER | MOUNTING POSITION |
|---|---|
| 0000:01:10.0 | PCI-Slot#1 |
| 0000:01:20.0 | PCI-Slot#2 |
| 0000:01:30.0 | PCI-Slot#3 |
| . | |
| . | |

FIG.2

| MESSAGE | FLAG |
|---|---|
| eth0:Hardware Error | 1 |
| eth1:Hardware Error | 1 |
| ⋮ | ⋮ |

FIG.4

■NIC:
igb [0-9a-fA-F]+:[0-9a-fA-F]+:[0-9a-fA-F]+\.[0-9]+: Hardware Error
kernel: e1000e [0-9a-fA-F]+:[0-9a-fA-F]+:[0-9a-fA-F]+\.[0-9]+: [^ ]+: Failed to allocate memory
■FC(Fiber channel)
lpfc[0-9]* (([0-9a-fA-F]+):([0-9a-fA-F]+):([0-9a-fA-F]+)\.([0-9a-fA-F]+)): Adapter reset failed
■Disk
kernel: .* [0-9]+:[0-9]+:[0-9]+:[0-9]+: (\[sd[a-z]+\] )?Unsupported sector size
. . .

FIG.3

```
eth0    Link encap:Ethernet  HWaddr xx:xx:xx:xx:xx:xx
        inet addr:192.168.10.100  Bcast:192.168.10.255  Mask:255.255.255.0
              .
              .
              .
eth1    Link encap:Ethernet  HWaddr xx:xx:xx:xx:xx:xx
        inet addr:192.168.10.101  Bcast:192.168.10.255  Mask:255.255.255.0
              .
              .
              .
```

FIG.8

```
driver: e1000
version:
firmware-version: N/A
bus-info: 0000:01:10.0
```

FIG.9

```
Warning 11602 PCI-Slot#1 e1000e:0000:01:10.0 Adapter error (Hardware Error)
vendor-id=8086 device-id=10CD revision=1
```

FIG.10

MANAGEMENT APPARATUS, METHOD AND PROGRAM

CROSS-REFERENCE TO RELATED APPLICATIONS

This application is a continuation application, filed under 35 U.S.C. section 111(a), of International Application PCT/JP2013/057613 filed on Mar. 18, 2013, the entire contents of which are incorporated herein by reference.

FIELD

This technique relates to a technique for monitoring hardware.

BACKGROUND

Techniques as described below are known as techniques for monitoring whether a fault occurs in a computer.

For example, a system in which a management server collects information of an apparatus to be monitoredby installing a program for gathering information on an OS (Operating System) operating in the apparatus is known. In this system, the program in a memory of the management server regularly performs polling in order to gather information for the apparatus to be monitored. The program in the memory of the apparatus to be monitored transmits information on a state of the apparatus and information on performance of the apparatus to the management server when the polling from the management server is performed.

However, in this system, because the program installed into the apparatus to be monitored depends on the OS and the program is updated whenever the OS is revised or the like, it is laborious. Moreover, in this system, because the program is resident in the memory of the apparatus to be monitored, there is a problem that a load is applied to the apparatus. Furthermore, in a specific virtual environment, it is difficult to obtain physical information due to virtualization, and information obtained from a host OS can be limited depending on a policy of the OS vendor.

On the other hand, there is a system (hereinafter referred to as an agentless monitoring system) which can monitor without installing the program for gathering information into the apparatus to be monitored. In this system, a j obmonitoringprogram in a job monitoring server reads a log from a job log file of a server to be monitored based on environment setting information, determines a state of a job to be monitored, and outputs the determination result to an intermediate log file when it comes a predetermined time. Furthermore, a log transmission program in the job monitoring server reads an intermediate log from the intermediate log file at predetermined time intervals, and transmits the intermediate log to a remote monitoring server through communication lines.

The agentless monitoring system can solve a problem that occurs in a system other than the agentless monitoring system. However, the agentless monitoring system described above monitors a state of a job in the beginning or the end of the job, but cannot monitor hardware. Moreover, because the log transmission program performs processing at the predetermined time intervals, it is impossible to monitor in real time.

As described above, it is impossible to monitor hardware in an agentless monitoring system in real time by the conventional techniques.

Patent Document 1: International Publication Pamphlet No. WO 2009/144969

Patent Document 2: Japanese Laid-open Patent Publication No. 2011-159011

SUMMARY

A management apparatus relating to this invention monitors hardware faults in an information processing apparatus. And the management apparatus includes: a first processing unit that determines whether a first notification representing that a fault occurred includes identification information of hardware in which the fault occurred, upon receiving the first notification from the information processing apparatus; a second processing unit that transmits an execution request to execute a module for obtaining the identification information of the hardware to the information processing apparatus, upon determining that the first notification does not include the identification information of the hardware; and a third processing unit that transmits a stop request to stop executing the module to the information processing apparatus, upon receiving the identification information of the hardware from the information processing apparatus.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 2 is a diagram depicting an example of data stored in a hardware data storage unit;

FIG. 3 is a diagram depicting an example of data stored in a filter file storage unit;

FIG. 4 is a diagram depicting an example of data stored in a determination flag storage unit;

FIG. 8 is a diagram depicting an example of data obtained by a data obtaining tool;

FIG. 9 is a diagram depicting an example of data obtained by the data obtaining tool;

FIG. 10 is a diagram depicting an example of data included in a notification to a user terminal.

DESCRIPTION OF EMBODIMENTS

Figure 1:
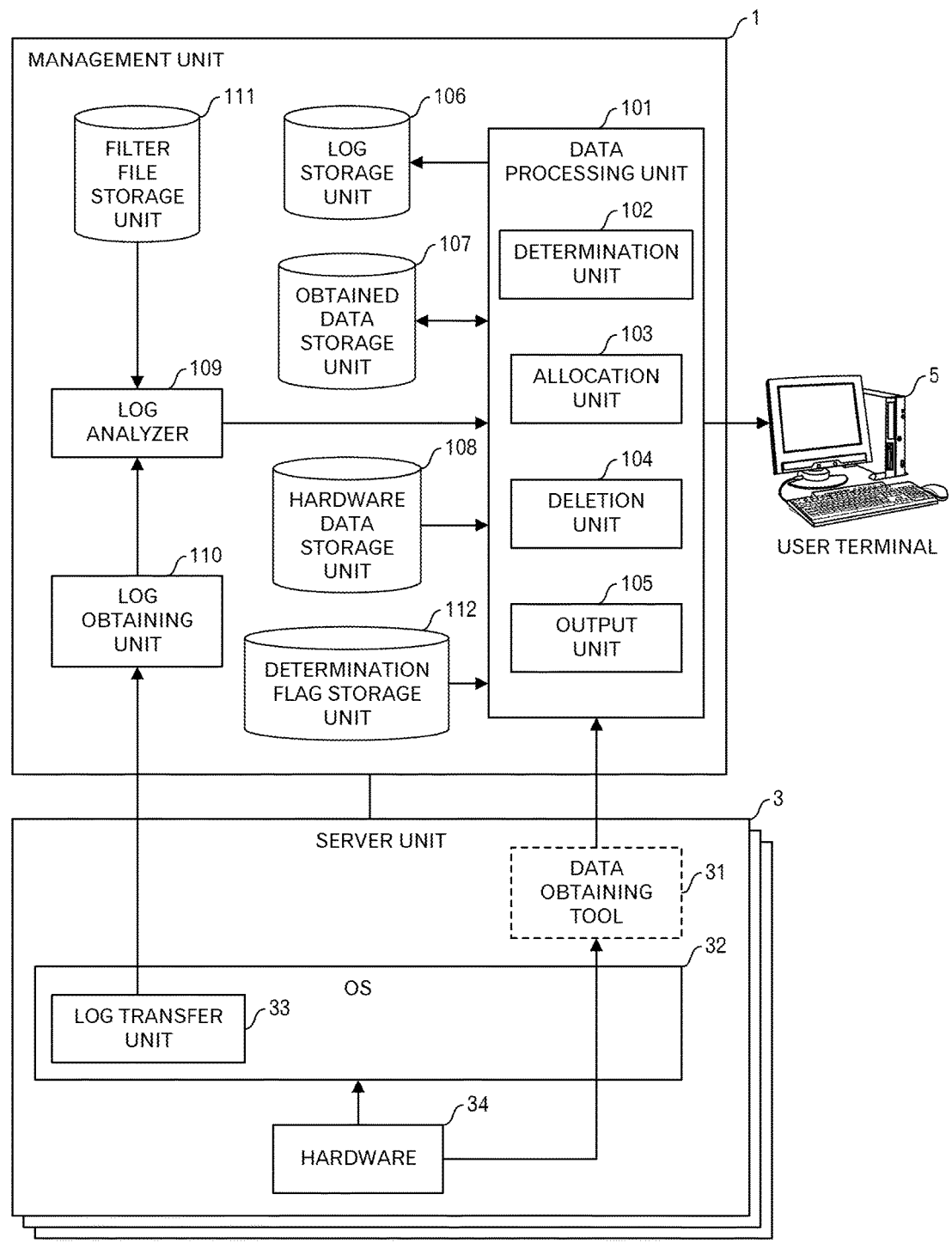
FIG. 1 is a diagram depicting an outline of a system relating to this embodiment.

FIG. 1 illustrates a system outline relating to this embodiment. One or plural server units 3 and a user terminal 5 are connected to a management unit 1 which performs main processing in this embodiment. The management unit 1 is a physical server which monitors the server unit 3. The server unit 3 is a physical server which performs business processing or the like. The user terminal 5 is a terminal operated by an administrator of the system relating to this embodiment.

In the management unit 1, a data processing unit 101 including a determination unit 102, an allocation unit 103, a deletion unit 104, and an output unit 105, a log analyzer 109, and a log obtaining unit 110 are executed by a CPU (Central Processing Unit) which is not illustrated. A log storage unit 106, an obtained data storage unit 107, a hardware data storage unit 108, a filter file storage unit 111, and a determination flag storage unit 112 are regions which are reserved in a memory or other storage devices and store data.

The log obtaining unit 110 receives a message which represents a state and performance of the server unit 3 from a log transfer unit 33 in the server unit 3 by a named pipe, and outputs to the log analyzer 109. The log analyzer 109 uses the message that has been received from the log obtaining unit 110 and data stored in the filter file storage unit 111 to determine whether the received message is a message which represents that a fault occurred. When it is determined that the received message is a message which represents that a fault occurred, the log analyzer 109 outputs the message to the data processing unit 101.

The determination unit 102 uses data stored in the determination flag storage unit 112 to determine whether to obtain, from the server unit 3, identification information of hardware (for example, a network interface card, a hard disk, or the like) in which a fault occurred. When it is determined that the identification information of the hardware in which the fault occurred is obtained from the server unit 3, the allocation unit 103 transmits a data obtaining tool 31 which is a module for obtaining the identification information of the hardware to the server unit 3, and causes the server unit 3 to execute it. The identification information of the hardware is, for example, information of a bus to which the hardware is connected, information of the vendor, or the like. When receiving the identification information of the hardware from the data obtaining tool 31, the deletion unit 104 stores the identification information of the hardware in the obtained data storage unit 107, and transmits, to the server unit 3, a stop request to stop execution of the module that has been transmitted. The output unit 105 uses the received identification information of the hardware and data stored in the hardware data storage unit 108 to generate notification, and transmits it to the user terminal 5.

The server unit 3 includes hardware 34 which is a network interface card, a hard disk, or the like. In the server unit 3, an OS 32 including the log transfer unit 33 is executed by the CPU that is not illustrated. Moreover, when the data obtaining tool 31 is allocated in the server unit 3, the data obtaining tool 31 is executed by the CPU that is not illustrated. Because the data obtaining tool 31 is not always executed, it is illustrated by a block of a dotted line in FIG. 1.

The data obtaining tool 31 obtains the identification information of the hardware from the hardware 34, and transmits it to the management unit 1. The log transfer unit 33 transmits the message which represents the state and the performance of the server unit 3 to the log obtaining unit 110 in the management unit 1 through the named pipe. The log transfer unit 33 is a processing unit that executes a log transfer function which the OS 32 generally has such as a syslog daemon in Linux (a registered trademark). Because the log transfer unit 33 immediately transmits the message by using the named pipe when receiving the message from the driver of the hardware, the management unit 1 can know the state of the server unit 3 in real time.

FIG. 2 illustrates an example of data stored in the hardware data storage unit 108. The example illustrated in FIG. 2 is an example in a case that hardware is a PCI (Peripheral Component Interconnect) card. In this case, a bus number is stored in association with information which represents a mounting position of the PCI card.

FIG. 3 illustrates an example of data stored in the filter file storage unit 111. As illustrated in FIG. 3, patterns of messages, which are expressed by regular expression, are stored in the filter file storage unit 111. When a message which has been received from the log obtaining unit 110 matches one of the patterns, the log analyzer 109 determines that the message is a message which represents that a fault occurred (in other words, a message to be reported). For example, when having received a message "eth0:Hardware Error", the log analyzer 109 determines that the message is a message which represents that a fault occurred because the message matches the pattern "eth[0-9]:Hardware Error". The patterns of messages, which are expressed by regular expression, are prepared for each message which a driver of hardware outputs.

FIG. 4 illustrates an example of data stored in the determination flag storage unit 112. In the example illustrated in FIG. 4, a message and a flag are stored in the determination flag storage unit 112. The determination unit 102 determines that a message whose flag is "1" is a message which represents that identification information of hardware should be obtained, and that a message whose flag is "0" is a message which represents that identification information of hardware do not have to be obtained.

Figure 5:
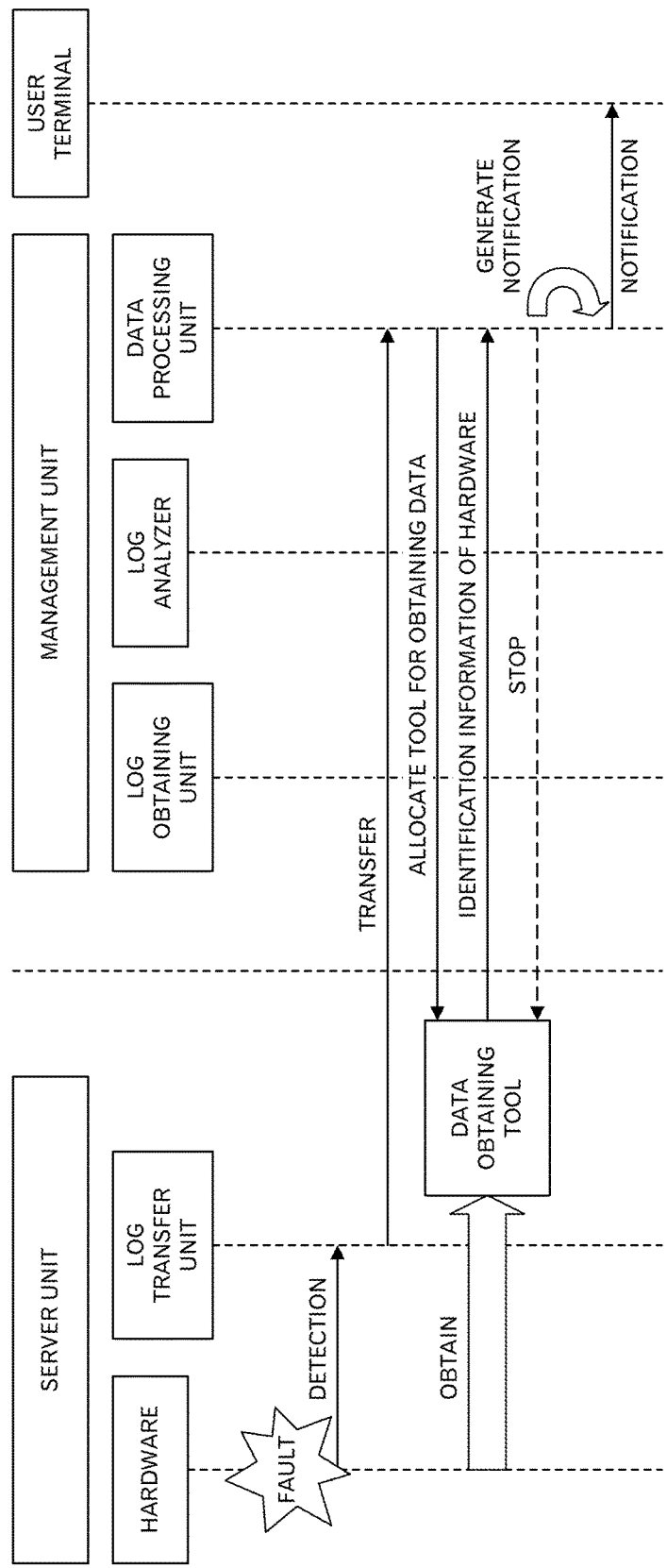
FIG. 5 is a sequence diagram of processing.

Next, an outline of operation of the system illustrated in FIG. 1 will be explained by using a sequence diagram illustrated in FIG. 5.

Assume that a fault has occurred in the hardware 34 in the server unit 3. In this case, the log transfer unit 33 detects the fault having occurred on the hardware 34, and transmits a message which represents that the fault occurred to the log obtaining unit 110 in the management unit 1 by the named pipe.

The log obtaining unit 110 outputs, to the log analyzer 109, the message that has been received from the log transfer unit 33. When determining that the message that has been received from the log obtaining unit 110 is a message which represents that a fault occurred, the log analyzer 109 outputs the message to the data processing unit 101.

When the data processing unit 101 determines that the identification information of the hardware is to be obtained for the received message, the data processing unit 101 allocates the data obtaining tool 31 on the OS of the server unit 3, and causes the server unit 3 to execute the data obtaining tool 31. When succeeding in obtaining the identification information of the hardware in the server unit 3, the data obtaining tool 31 transmits the obtained identification information to the management unit 1.

When receiving the identification information of the hardware, the data processing unit 101 in the management unit 1 stops the execution of the data obtaining tool 31 in the server unit 3 (or deletes the data obtaining tool 31). The data processing unit 101 generates notification including the received identification information of the hardware, and transmits it to the user terminal 5.

By performing processing as described above, because a user who operates the user terminal 5 can recognize in which hardware a fault has occurred, it becomes possible to immediately perform handling such as replacement of the hardware.

Figure 6:
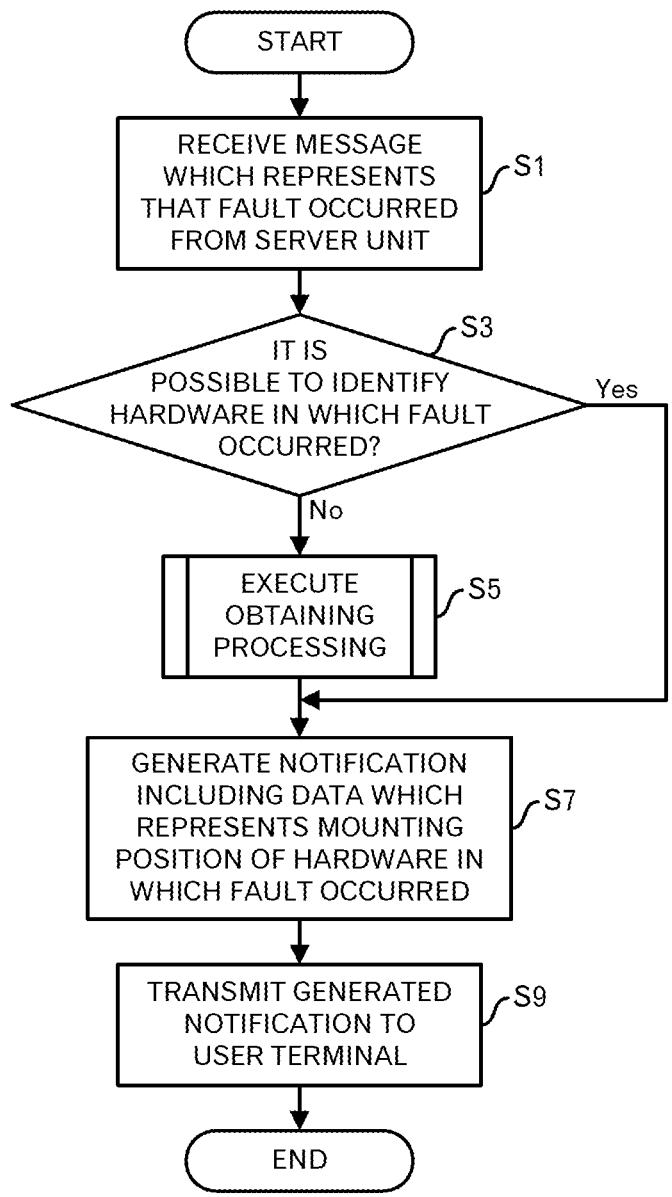
FIG. 6 is a diagram depicting a main processing flow.

Next, operation of the system illustrated in FIG. 1 will be explained in detail by using FIGS. 6 to 10. Assume that it is determined, by the log analyzer 109, the message that has been received from the log transfer unit 33 in the server unit 3 is a message which represents that a fault occurred. Then, the log analyzer 109 outputs the message to the data processing unit 101. The determination unit 102 in the data processing unit 101 receives the message which represents that the fault occurred. (FIG. 6: step S1)

The determination unit 102 determines whether it is possible to identify hardware in which a fault occurred (step S3). The determination at the step S3 is performed by determining whether a flag stored in association with the received message in the determination flag storage unit 112 is "0" or not. When the flag is "0", identification information of hardware is included in the message, and when the flag is "1", the identification information of the hardware is not included in the message.

When it is possible to identify hardware in which the fault occurred (step S3: Yes route), the processing shifts to the step S7. On the other hand, when it is not possible to identify hardware in which the fault occurred (step S3: No route), the determination unit 102 requests to execute obtaining processing to the allocation unit 103 and the deletion unit 104. Accordingly, the allocation unit 103 and the deletion unit 104 execute the obtaining processing (step S5). The obtaining processing will be explained by using FIGS. 7 to 9.

Figure 7:
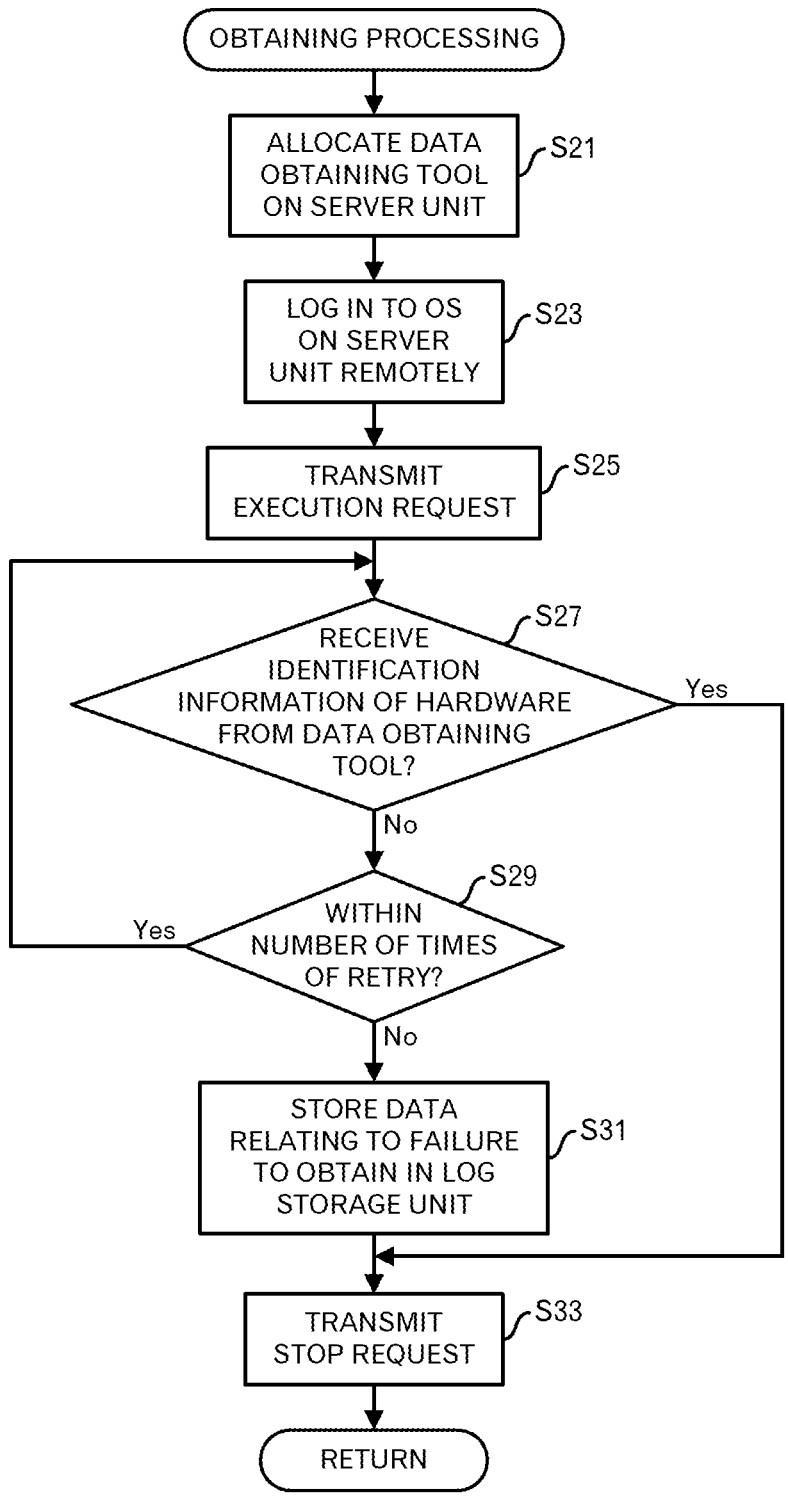
FIG. 7 is a diagram depicting a processing flow of obtaining processing.

First, the allocation unit 103 allocates, by using a command, the data obtaining tool 31 on the sever unit 3 which has the hardware in which the fault occurred (FIG. 7: step S21). In other words, the allocation unit 103 transmits, to the server unit 3, a copy of the data obtaining tool 31 which the management unit 1 has, and causes to store it into a predetermined position on the server unit 3. As explained above, the data obtaining tool 31 is a module for obtaining identification information of hardware. A command for obtaining identification information of hardware, an API (Application Program Interface), and the like are registered in the data obtaining tool 31.

The allocation unit 103 remotely logs in to the OS 32 in the server unit 3 by using ssh (secure shell) or the like (step S23), and transmits an execution request to execute the data obtaining tool 31 to the server unit 3 (step S25).

When receiving the execution request, the data obtaining tool 31 in the server unit 3 obtains identification information of the hardware 34 by using a predetermined command, API and the like.

Here, the data obtaining tool 31 executes a command to identify hardware which the server unit 3 has. For example, when the command"#ifconfig -a" is executed, it is possible to identify a network interface which the server unit 3 has. FIG. 8 illustrates an example of data obtained when the command "#ifconfig -a" is executed. This data enables the data obtaining tool 31 to recognize that the server unit 3 has at least the network interface "eth0" and the network interface "eth1". However, because the names "eth0" and "eth1" are names that the OS 32 has independently allocated, a user does not know which network interface cards the names are.

Therefore, the data obtaining tool 31 obtains identification information of each hardware which the server unit 3 has by further executing a command. For example, when the command "#ethtool -i eth0" is executed, it is possible to obtain bus information relating to the network interface "eth0". The example illustrated in FIG. 9 is an example of data obtained when the data obtaining tool 31 executes the command "#ethtool -i eth0". The part "0000:01:10.0" in FIG. 9 is bus information, and this bus information enables to identify on which network interface a fault occurred.

When obtaining the identification information of the hardware, the data obtaining tool 31 transmits it to the management unit 1.

The deletion unit 104 in the data processing unit 101 of the management unit 1 determines whether the identification information of the hardware has been received from the data obtaining tool 31 (step S27).

When the identification information of the hardware has been obtained (step S27: Yes route), the deletion unit 104 transmits a stop request to stop the execution of the data obtaining tool 31 to the server unit 3 (step S33). Then, the processing returns to the calling-source processing. Accordingly, the server unit 3 stops the execution of the data obtaining tool 31. The stop request may include a deletion request to delete the data obtaining tool 31. In that case, the server unit 3 deletes the data obtaining tool 31.

On the other hand, when the identification information of the hardware has not been obtained (step S27: No route), it is determined whether a number of times of retry is within a predetermined number of times of retry (step S29). When the number of times of retry is within the predetermined number of times of retry (step S29: Yes route), the processing returns to the processing of the step S27 to retry. When the number of times of retry is not within the predetermined number of times of retry (step S29: No route), because the data obtaining tool 31 fails to obtain, the deletion unit 104 stores data relating to failure to obtain into the log storage unit 106 (step S31). Then, the processing shifts to the processing of the step S33.

The data relating to failure to obtain is data such as "2012 Jan. 10 13:30 Warning Failed to get PCI device information.". This data includes data that represents date and time at which a fault occurred, an error level (Warning, Error, or Information), and contents.

By executing processing as described above, it becomes possible to obtain the identification information of the hardware 34 without installing resident software in the OS 32 of the server unit 3.

Returning to the explanation of FIG. 6, the output unit 105 extracts data which represents a mounting position from the hardware data storage unit 108 by using the obtained identification information of the hardware as a key, and generates a notification including the extracted data (step S7).

FIG. 10 illustrates an example of data included in the notification to the user terminal 5. In addition to the data included in the source message, the example illustrated in FIG. 10 includes an error level (Warning, Error, or Information), an error number, data which represents a mounting position of hardware, a driver name, bus information, identification information of a vendor, identification information of a device, and a revision number.

The output unit 105 transmits the generated notification to the user terminal 5 (step S9). Then, the processing ends.

By executing the processing as described above, only when identification information of hardware in which a fault occurred is not included in the message, the data obtaining tool 31 is executed in the server unit 3, and the identification information of the hardware is obtained. This enables to monitor hardware in real time without installing a resident program into the server unit 3. Then, if monitoring is performed in real time, it becomes possible to immediately handle a fault which has occurred.

Moreover, because the data obtaining tool 31 does not depend on the OS 32 of the server unit 3, the data obtaining tool 31 is not affected by the revision of the OS 32. Furthermore, because the data obtaining tool 31 does not permanently reside in the server unit 3, it becomes possible to reduce a resource usage.

Although one embodiment of this invention was explained above, this invention is not limited to those. For example, the functional block configuration of the management unit 1 and the server unit 3, which are explained above, do not always correspond to actual program module configurations.

Moreover, the respective formats of the aforementioned tables are mere examples, and may be changed. Furthermore, as for the processing flow, as long as the processing results do not change, the turns of the steps may be exchanged or the steps may be executed in parallel.

Moreover, the data obtaining tool 31 may be allocated on the server unit 3 in advance and the management unit 1 may transmit the execution request. This enables to obtain identification information of hardware.

Moreover, when a user can identify a part at which a fault occurred by the identification information of hardware obtained from the data obtaining tool 31, the identification information of the hardware may be included in a notification to the user as it is.

Moreover, when a fault occurred in firmware of a network interface card or the like, for example, the message "Ipfc: 0000:1a:00.0 Failed to allocate memory" is outputted from the log transfer unit 33. In this way, replacement of components does not have to be performed when the fault is not a fault of hardware itself. Therefore, the obtaining processing may not be executed and the part in which the fault occurred is not notified to the user. The notification to the user includes data such as "Warning 12242 Software Ipfc: 0000:1a:00.0 Failed to allocate memory".

Moreover, also when a virtualized environment is realized on the server unit 3 by using, for example, VMware or the like, this embodiment is applicable. In this case, the management unit 1 allows to access to a host OS remotely by using ssh or the like, and this enables to allocate the data obtaining tool 31 on the server unit 3 and to obtain identification information of hardware.

Figure 11:
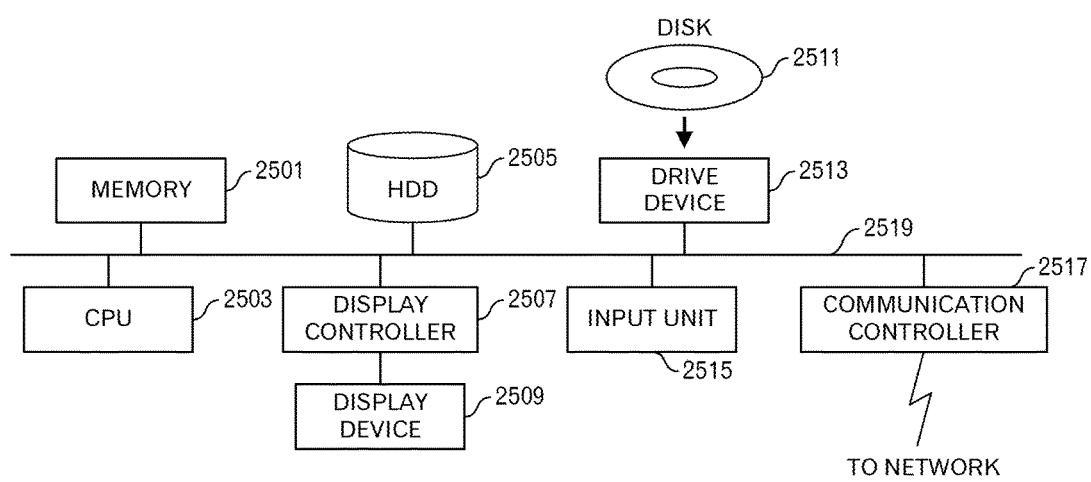
FIG. 11 is a functional block diagram of a computer.

In addition, the aforementioned management unit 1 and server unit 3 are computer devices as illustrated in FIG. 11. That is, a memory 2501 (storage device), a CPU 2503 (processor), a hard disk drive (HDD) 2505, a display controller 2507 connected to a display device 2509, a drive device 2513 for a removable disk 2511, an input unit 2515, and a communication controller 2517 for connection with a network are connected through a bus 2519 as illustrated in FIG. 11. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer device as stated above, the hardware such as the CPU 2503 and the memory 2501, the OS and the application programs systematically cooperate with each other, so that various functions as described above in details are realized The aforementioned embodiment is summarized as follows:

A management apparatus relating to a first aspect of this embodiment monitors hardware faults in an information processing apparatus. And the management apparatus includes: (A) a first processing unit that determines whether a first notification representing that a fault occurred includes identification information of hardware in which the fault occurred, upon receiving the first notification from the information processing apparatus; (B) a second processing unit that transmits an execution request to execute a module for obtaining the identification information of the hardware to the information processing apparatus, upon determining that the first notification does not include the identification information of the hardware; and (C) a third processing unit that transmits a stop request to stop executing the module to the information processing apparatus, upon receiving the identification information of the hardware from the information processing apparatus.

Identification information of hardware in which a fault occurred is sometimes not included in a log transferred in real time by a transfer function of a log or the like, which a general OS has. In the case, it is impossible to notify a user of the place in which the fault occurred. Therefore, by performing a processing as described above, only when the identification information of the hardware in which a fault occurred is not included in the first notification, the module is executed in the information processing apparatus and information of the hardware is to be obtained. Thus, it becomes possible to monitor the hardware in real time in an agentless monitoring system in which a resident module is not installed into the information processing apparatus.

Moreover, (b1) the second processing unit may transmit the module to the information processing apparatus, upon determining that the first notification does not include the identification information of the hardware. And the stop request may include a deletion request to delete the module from the information processing apparatus. Thus, because the information processing apparatus does not have to have the module, it becomes possible to reduce an amount of usage of a storage device.

Moreover, the management apparatus may further include (D) a fourth processing unit that generates a second notification that includes information of the hardware in which the fault occurred, upon determining that the first notification includes the identification information of the hardware in which the fault occurred or upon receiving the identification information of the hardware from the information processing apparatus and outputs the second notification. Thus, it becomes possible to notify a user of the identification information of the hardware in which the fault occurred.

A management method relating to a second aspect of this embodiment is executed by a management apparatus which monitors hardware faults in an information processing apparatus. And, the management method includes: (E) determining whether a first notification representing that a fault occurred includes identification information of hardware in which the fault occurred, upon receiving the first notification from the information processing apparatus; (F) first transmitting an execution request to execute a module for obtaining the identification information of the hardware to the information processing apparatus, upon determining that the first notification does not include the identification information of the hardware; (G) and second transmitting a stop request to stop executing the module to the information processing apparatus, upon receiving the identification information of the hardware from the information processing apparatus.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A management apparatus which monitors hardware faults in an information processing apparatus, comprising:

a memory; and a processor configured to use the memory and execute a process, the process comprises:

determining whether a first notification representing that a fault occurred includes identification information of hardware in which the fault occurred, upon receiving the first notification from the information processing apparatus;

first transmitting an execution request to execute a module for obtaining the identification information of the hardware to the information processing apparatus, upon determining that the first notification does not include the identification information of the hardware; and second transmitting a stop request to stop executing the module to the information processing apparatus, upon receiving the identification information of the hardware from the information processing apparatus.

2. The management apparatus as set forth in claim 1, wherein the first transmitting comprises:

third transmitting the module to the information processing apparatus, upon determining that the first notification does not include the identification information of the hardware, and the stop request includes a deletion request to delete the module from the information processing apparatus.

3. The management apparatus as set forth in claim 1, wherein the process further comprises:

generating a second notification that includes information of the hardware in which the fault occurred, upon determining that the first notification includes the identification information of the hardware in which the fault occurred or upon receiving the identification information of the hardware from the information processing apparatus; and outputting the second notification.

4. A management method, comprising:

determining, by a management apparatus which monitors hardware faults in an information processing apparatus, whether a first notification representing that a fault occurred includes identification information of hardware in which the fault occurred, upon receiving the first notification from the information processing apparatus;

first transmitting, by the management apparatus, an execution request to execute a module for obtaining the identification information of the hardware to the information processing apparatus, upon determining that the first notification does not include the identification information of the hardware; and second transmitting, by the management apparatus, a stop request to stop executing the module to the information processing apparatus, upon receiving the identification information of the hardware from the information processing apparatus.

5. A non-transitory computer-readable storage medium storing a program for causing a management apparatus which monitors hardware faults in an information processing apparatus to execute a process, the process comprising:

determining whether a first notification representing that a fault occurred includes identification information of hardware in which the fault occurred, upon receiving the first notification from the information processing apparatus;

first transmitting an execution request to execute a module for obtaining the identification information of the hardware to the information processing apparatus, upon determining that the first notification does not include the identification information of the hardware; and second transmitting a stop request to stop executing the module to the information processing apparatus, upon receiving the identification information of the hardware from the information processing apparatus.

* * * * *